(12) United States Patent
Sugiura et al.

(10) Patent No.: US 8,854,768 B2
(45) Date of Patent: Oct. 7, 2014

(54) MAGNETIC HEAD AND MAGNETIC RECORDING/REPRODUCING APPARATUS

(71) Applicant: Hitachi, Ltd., Tokyo (JP)

(72) Inventors: Kenji Sugiura, Tokyo (JP); Yo Sato, Tokyo (JP); Masukazu Igarashi, Tokyo (JP); Katsuro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/167,287

(22) Filed: Jan. 29, 2014

(65) Prior Publication Data

US 2014/0211340 A1   Jul. 31, 2014

(30) Foreign Application Priority Data

Jan. 31, 2013   (JP) .................... 2013-017335

(51) Int. Cl.
*G11B 5/31* (2006.01)
(52) U.S. Cl.
USPC ........................................ 360/125.3
(58) Field of Classification Search
USPC ........................................ 360/125.3
See application file for complete search history.

(56) References Cited

U.S. PATENT DOCUMENTS

| | | | |
|---|---|---|---|
| 8,081,397 B2 * | 12/2011 | Funayama et al. | 360/125.08 |
| 8,446,691 B2 * | 5/2013 | Takagishi et al. | 360/125.3 |
| 8,625,235 B2 * | 1/2014 | Takano et al. | 360/125.15 |
| 8,687,321 B2 * | 4/2014 | Yamada et al. | 360/125.3 |
| 8,730,616 B2 * | 5/2014 | Yamada et al. | 360/125.3 |
| 8,755,147 B2 * | 6/2014 | Matsumoto et al. | 360/99.08 |
| 8,773,818 B2 * | 7/2014 | Taguchi et al. | 360/125.3 |
| 2005/0023938 A1 | 2/2005 | Sato et al. | |
| 2011/0205655 A1 | 8/2011 | Shimizu et al. | |

FOREIGN PATENT DOCUMENTS

| | | |
|---|---|---|
| JP | 2005-25831 A | 1/2005 |
| JP | 2010-40126 A | 2/2010 |

OTHER PUBLICATIONS

Jian-Gang Zhu et al. Microwave Assisted Magnetic Recording, IEEE Transactions on Magnetics, Jan. 2008, pp. 125-131, vol. 44, No. 1.
Yiming Wang et al., Media damping constant and performance characteristics in microwave assisted magnetic recording with circular ac field, Journal of Applied Physics, 105, 07B902 (2009).

* cited by examiner

*Primary Examiner* — Mark Blouin
(74) *Attorney, Agent, or Firm* — Antonelli, Terry, Stout & Kraus, LLP.

(57) ABSTRACT

To realize a highly reliable magnetic head for a high-frequency magnetic field assisted recording system by preventing current crowding in an oscillator and increasing the current resistance of the oscillator. Between a main pole that generates a recording magnetic field and a trailing shield, an oscillator that includes a non-magnetic metal layer, a spin injection pinned layer, an intermediate layer, and a high-frequency magnetic field generation layer and that generates a high-frequency magnetic field is disposed. The non-magnetic metal layer adjacent to the main pole is tapered with the width gradually increasing from the trailing side toward the leading side.

14 Claims, 11 Drawing Sheets

Taper width of the nonmagnetic metal layer $x_2$ (nm)

MAGNETIC HEAD AND MAGNETIC RECORDING/REPRODUCING APPARATUS

CLAIM OF PRIORITY

The present application claims priority from Japanese patent application JP 2013-017335 filed on Jan. 31, 2013, the content of which is hereby incorporated by reference into this application.

TECHNICAL FIELD

The present invention relates to a magnetic head and a magnetic recording/reproducing apparatus, and particularly to a magnetic recording head with the function of inducing magnetization reversal by applying a high-frequency magnetic field to a magnetic recording medium, and to a magnetic recording/reproducing apparatus provided with the magnetic recording head.

BACKGROUND ART

In a magnetic recording/reproducing apparatus such as a hard disk drive (HDD), in order to increase areal recording density, it is important to increase recording capacity. Thus, assisted recording by which the coercive force of the magnetic recording medium is temporarily decreased during recording by applying heat or a high-frequency magnetic field is gaining attention. A system based on the application of high-frequency magnetic field is referred to as "microwave-assisted magnetic recording (MAMR)".

In MAMR, a strong high-frequency magnetic field of a microwave band is applied to a nanometer-order area to locally excite the recording medium so as to lower the magnetization reversal field when information is recorded. However, because MAMR uses magnetic resonance, a large effect of lowering the magnetization reversal field cannot be obtained unless the high-frequency magnetic field of a high frequency proportional to the anisotropy magnetic field of the recording medium is used. As a countermeasure, Patent Document 1 discloses a high-frequency oscillator for generating a high-frequency assist magnetic field, with a structure similar to that of a giant magnetoresistance (GMR) effect device in which a stacked film is sandwiched between electrodes. The high-frequency oscillator is configured to generate a high-frequency vibrating magnetic field in a localized area by injecting conduction electrons with spin fluctuation generated in the GMR structure into a magnetic material via a non-magnet.

Non-patent Document 1 discloses a technology for recording information in a magnetic recording medium having a large magnetic anisotropy by transmitting a spin-transfer torque from a spin injection pinned layer of an oscillator disposed adjacent to a main pole of a perpendicular magnetic head to an adjacent high-frequency magnetic field generation layer (FGL) via an intermediate layer of Cu, and causing a microwave (high-frequency magnetic field) to be generated by rotating the magnetization of the FGL in a plane at high speed. Further, Non-patent Document 2 discloses a technology for efficiently assisting the magnetization reversal of the magnetic recording medium by disposing the oscillator between the main pole of the magnetic recording head and a trailing shield, and varying the rotating direction of the high-frequency magnetic field in accordance with the polarity of the recording magnetic field.

PRIOR ART DOCUMENT

Patent Documents

Patent Document 1: JP 2005-025831 A
Patent Document 2: JP 2010-40126 A

Non-Patent Documents

Non-patent Document 1: "Microwave Assisted Magnetic Recording" J.-G. Zhu et al., IEEE Trans. Magn., Vol. 44, No. 1, pp. 125 (2008).
Non-patent Document 2: "Media damping constant and performance characteristics in microwave assisted magnetic recording with circular as field" Y. Wang et al., Journal of Applied Physics 105, 07B902 (2009).

SUMMARY OF THE INVENTION

Problems to be Solved by the Invention

As an important issue in oscillators used for MAMR, there is the problem of device breakdown by current crowding. In MAMR, in order to obtain the required high-frequency magnetic field from the oscillator, it is necessary to apply a voltage between the main pole of the magnetic head and the trailing shield, and to cause a current to flow through the oscillator in a perpendicular direction (the direction in which layers are stacked). By causing the current flow, a spin-transfer torque is provided to the magnetization of the FGL from the pinned layer, whereby precession of the FGL magnetization can be caused and a high-frequency magnetic field oscillation can be obtained. The spin-transfer torque provided to the FGL is proportional to the density of the current that flows through the device. Thus, a current with a high current density needs to be caused to flow into the device so as to prevent the FGL magnetization precession from converging. The current density (drive current), which may vary depending on the shape or material of the oscillator, is generally on the order of $2\times10^8$ A/cm$^2$. This drive current is approximately one fifth the expected breakdown current (on the order of $1\times10^9$ A/cm$^2$), and includes an operation margin for ensuring reliability.

However, when the magnetic head is repeatedly driven, a failure in which the oscillator is broken may be caused. A cause for the failure is that a high current density area reaching the breakdown current develops locally in the oscillator due to uneven current distribution, and the device structure is gradually broken from the area. The current crowding in the oscillator is caused by the rapid drawing of current from the main pole or the trailing shield, which are relatively wide compared with the oscillator, into the oscillator, which is of a size on the order of several tens of nanometers. At the entry of the oscillator where the width becomes sharply narrower, the flow of current from the periphery (flow lines) is concentrated at once, thereby forming areas at device end portions where more flow lines are concentrated, the areas having an extremely high current density exceeding the breakdown current. Such a biased current distribution is not improved even in the intermediate layer of the oscillator. Cu and Au, for example, in the intermediate layer are materials that readily cause electromigration. Thus, electromigration develops in the end portions with the high current density, whereby the GMR structure of the oscillator is broken gradually from the end portions, and eventually leading to device breakdown.

An object of the present invention is to provide a highly reliable magnetic head and magnetic recording/reproducing apparatus by forming, in a magnetic head for the high-frequency magnetic field assisted recording system, a highly current-resistant oscillator in which current crowding is prevented.

Solution to the Problems

According to the present invention, in a magnetic head for a high-frequency magnetic field assisted recording system, an oscillator that is provided in a recording section and that generates a high-frequency magnetic field includes a non-magnetic metal layer, a pinned layer, an intermediate layer, and an FGL. The non-magnetic metal layer is adjacent to a main pole or a trailing shield and tapered with a width in a track width direction or an element height direction gradually increased with increasing distance from the intermediate layer. The tapered shape may be such that both the width in the track width direction and the width in the element height direction are gradually increased.

The non-magnetic metal layers may be disposed at two locations of a position adjacent to the main pole and a position adjacent to the trailing shield at the same time. However, only the non-magnetic metal layer at one of the locations is tapered.

Effects of the Invention

According to the present invention, current crowding in the oscillator that generates the high-frequency magnetic field can be prevented, and the current resistance of the oscillator can be increased, whereby a highly reliable magnetic head can be realized.

Other problems, configurations, and effects may become apparent from a reading of the following description of embodiments.

Patent Document 2 discusses the problem of providing "a stable-operation and high-efficiency magnetic recording head such that the inversion time of the spin injection layer is decreased, a magnetic head assembly, and a magnetic recording apparatus", and describes a solution which is a magnetic recording head that includes a main pole; a shield disposed opposite the main pole; and a stack structure disposed between the main pole and the shield, the stack structure including a first magnetic layer with a coercive force smaller than a magnetic field applied from the main pole, a second magnetic layer with a greater film surface than the first magnetic layer; and an intermediate layer of a non-magnetic material disposed between the first magnetic layer and the second magnetic layer (see the Abstract). While the publication describes an example of a tapered oscillator structure, the publication does not describe the effect of improving current crowding in the oscillator, nor does it describe the structure of the non-magnetic metal layer. The publication does not include any suggestion regarding the present invention.

MODE FOR CARRYING OUT THE INVENTION

In the following, an embodiment of the present invention will be described with reference to the drawings.

Embodiment 1

Figure 1:
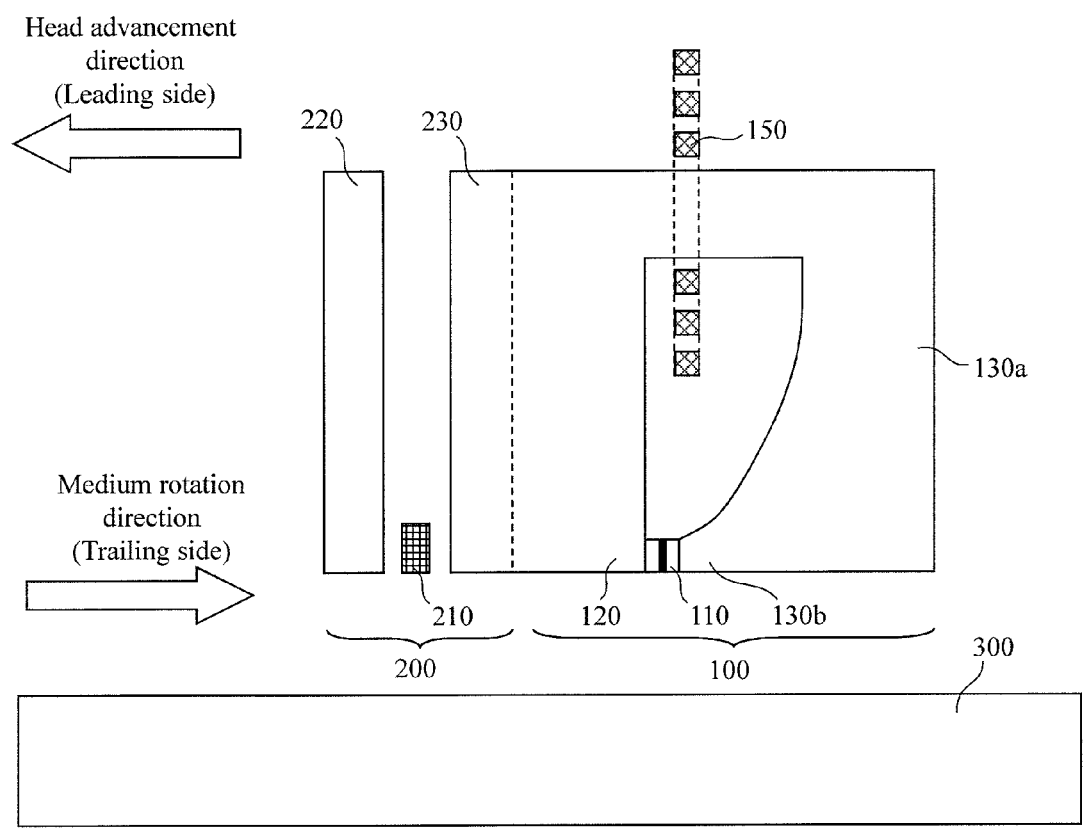
FIG. 1 is a schematic diagram of a configuration example of a magnetic head.

FIG. 1 is a schematic cross sectional view taken along the track direction of a magnetic recording/reproducing head according to an embodiment of the present invention. The magnetic recording/reproducing head (hereafter simply referred to as "the magnetic head") is a separate-recording/reproducing head including a recording section 100 and a reproduction section 200 for performing recording and reproduction, respectively, with respect to a rotating magnetic recording medium 300, such as a magnetic disk. The recording section 100 includes an oscillator 110 for generating a high-frequency magnetic field, a main pole 120 for generating a recording magnetic field, a coil 150 for magnetizing the main pole with a magnetic field, and a sub-pole 130a. In the illustrated example, a trailing shield 130b is disposed on the trailing side of the main pole 120; however, this may not necessarily be required. The direction in which the magnetic head is advanced with respect to the magnetic recording medium is defined as the "leading side". The direction opposite from the advancement direction of the magnetic head with respect to the magnetic recording medium is defined as the "trailing side". In the illustrated example, the reproduction section 200 is disposed in the front and the recording section 100 is disposed in the rear as viewed from the advancement direction of the magnetic head with respect to the magnetic recording medium 300. The arrangement may be reversed from the illustrated example so that the recording section 100 is disposed in the front and the reproduction section 200 is disposed in the rear as viewed from the advancement direction of the head.

The reproduction section 200 includes a reproduction sensor 210, a lower magnetic shield 220, and an upper magnetic shield 230, and reproduces a recording signal recorded in the magnetic recording medium 300. The reproduction sensor 210 may include a reproduction sensor with the so-called giant magneto-resistive (GMR) effect, or a reproduction sensor with the tunneling magneto-resistive (TMR) effect. The reproduction sensor 210 may also include a so-called differential reproduction sensor with two or more reproduction sensors that respond to an external magnetic field with opposite polarities. The lower magnetic shield 220 and the upper magnetic shield 230 may preferably be provided whenever possible, as the shields play an important role for improving the reproduction signal quality.

Figure 2:
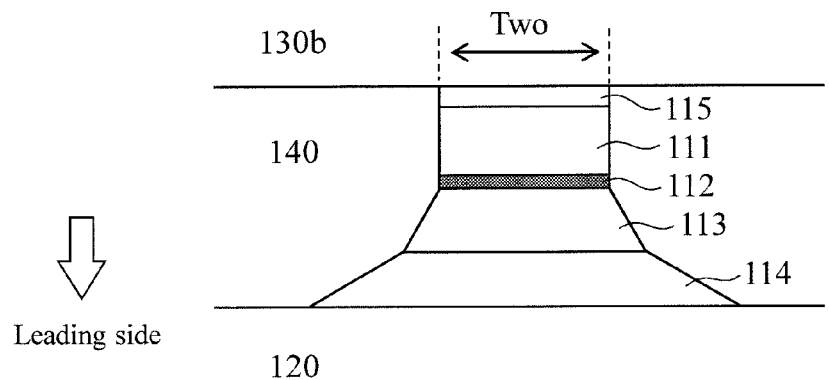
FIG. 2 is a schematic diagram of an example of an oscillator of a magnetic head as viewed from an air bearing surface.
Figure 3:
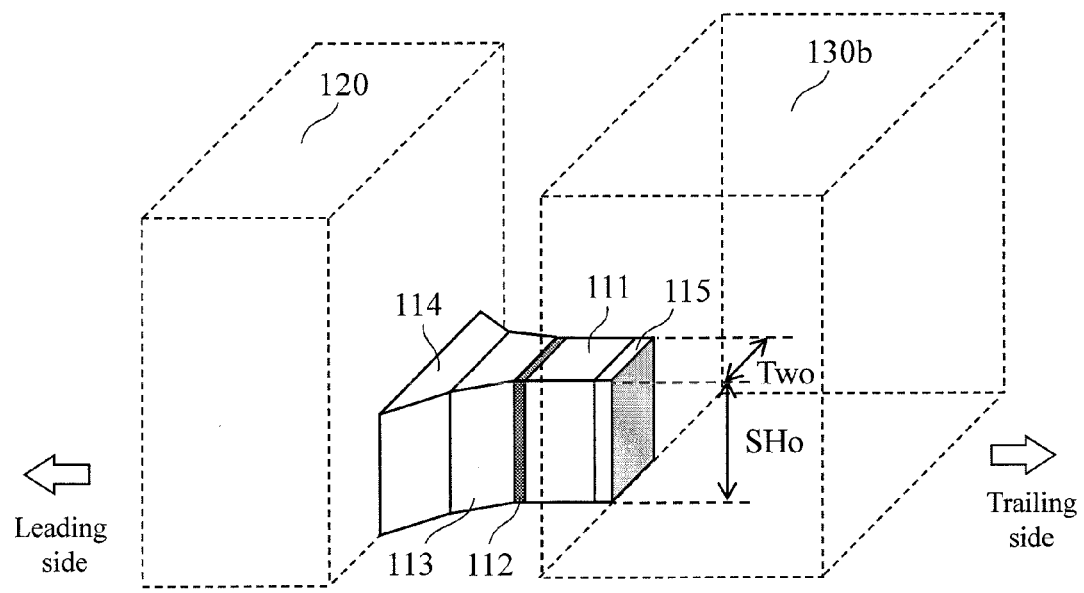
FIG. 3 is a perspective view of a configuration example of the oscillator of the magnetic head.

FIGS. 2 and 3 are schematic diagrams of a configuration example of the recording section of the magnetic head according to the present embodiment. FIG. 2 is a schematic diagram of the main pole 120 and the oscillator 110 as parts of the recording section 100 as viewed from the air bearing surface, with the leading side at the bottom. FIG. 3 is a perspective view of the oscillator of the recording section.

The oscillator 110 is disposed between the main pole 120 and the trailing shield 130b, and includes a high-frequency magnetic field generation layer (FGL) 111 for generating the high-frequency magnetic field, an intermediate layer 112 of a highly spin transmissive material, and a spin injection pinned layer (hereafter simply referred to as "the pinned layer") 113 for providing the FGL 111 with spin-transfer torque. While the oscillator 110 according to the present embodiment is formed by stacking the pinned layer 113, the intermediate layer 112, and the FGL 111 in that order from the main pole 120 side, the FGL 111, the intermediate layer 112, and the pinned layer 113 may be stacked in that order from the main pole 120 side. A current is caused to flow through the oscillator 110 in a direction from the pinned layer 113 toward the FGL 111. Numeral 140 designates a refill insulation layer.

The material of the FGL 111 is $Fe_{70}Co_{30}$, for example, with a film thickness of 15 nm, for example. The saturation magnetization of $Fe_{70}Co_{30}$ is 2.4 T, enabling the generation of a high high-frequency magnetic field. The FGL 111 can perform its role as an FGL as long as the material is a magnetic material. Examples of the material other than the FeCo alloy include an NiFe alloy, a Heusler alloy such as CoFeGe, CoMnGe, CoFeAl, CoFeSi, or CoMnSi, a Re-TM amorphous alloy such as TbFeCo, and a CoCr alloy. A material with negative perpendicular magnetic anisotropy energy, such as CoIr, may also be used. The film thickness of the FGL 111 may be more or less than 15 nm; preferably, however, the film thickness is in the range of not less than 5 nm and not more than 30 nm, for the following reasons. The film thickness of the FGL 111 is set so as to be not less than 5 nm because when the film thickness is too small, the high-frequency magnetic field strength may be decreased too much. The film thickness is set so as to be not more than 30 nm because if the film thickness is too large, multiple domains may be formed in the FGL 111, which would lead to a decrease in magnetic field strength.

The intermediate layer 112 is made of Cu, for example, with a film thickness of 3 nm, for example. Preferably, the material of the intermediate layer 112 is a non-magnetic material with high spin transmissivity. Examples other than Cu include Au and Ag; however, Au and Ag more readily cause electromigration than Cu. The pinned layer 113 is $[Co/Ni]_n$ (n is the number of [Co/Ni] stacked layers), for example, with a film thickness of 10 nm, for example. By using a material with perpendicular magnetic anisotropy in the pinned layer 113, oscillation of the FGL 111 can be stabilized. The perpendicular anisotropy magnetic field of the $[Co/Ni]_n$ used is 17 kOe. Examples of the material of the pinned layer 113 other than [Co/Ni], include artificial magnetic materials, such as $[Co/Pt]_n$ and $[Co/Pd]_n$. Based on the above-described configuration of the oscillator 110, a high-frequency magnetic field can be applied to the recording layer of the magnetic recording medium 300. In the main pole 120 and the shield 130b according to the present embodiment, a CoFe alloy with large saturation magnetization and small magnetocrystalline anisotropy is used.

The non-magnetic metal layer 114 with the tapered shape which characterizes the present embodiment will be described. The non-magnetic metal layer 114 is disposed adjacent to the main pole 120 in the oscillator 110 so as to block the magnetic coupling between the pinned layer 113 and the main pole 120. The material of the non-magnetic metal layer 114 is Ta, for example. Any other materials that are magnetically non-magnetic and that exhibit electrically metallic conduction may be used. Examples of the material other than Ta include Ru, Pt, Cr, and Ir. Not just a single material, but also an alloy or a stack of materials may be used. From a similar viewpoint, a non-magnetic metal layer 115 may be disposed on the trailing shield 130b side so as to block the magnetic coupling between the FGL 111 and the trailing shield 130b.

The present embodiment is characterized in that the non-magnetic metal layer 114 disposed adjacent to the main pole 120 has a tapered shape with the width in the track width direction gradually increasing from the trailing side toward the leading side. In other words, the non-magnetic metal layer 114 has the following shape. The width in the track width direction at an end face on the side closer to the intermediate layer 112 (hereafter referred to as "the first end face") is equal to or greater than a width Two of the intermediate layer 112 in the track width direction. The width in the track width direction at an end face farther from the intermediate layer 112 (hereafter referred to as "the second end face") is greater than the width in the track width direction at the first end face, the width in the track width direction gradually increasing with increasing distance from the intermediate layer 112.

Figure 4:
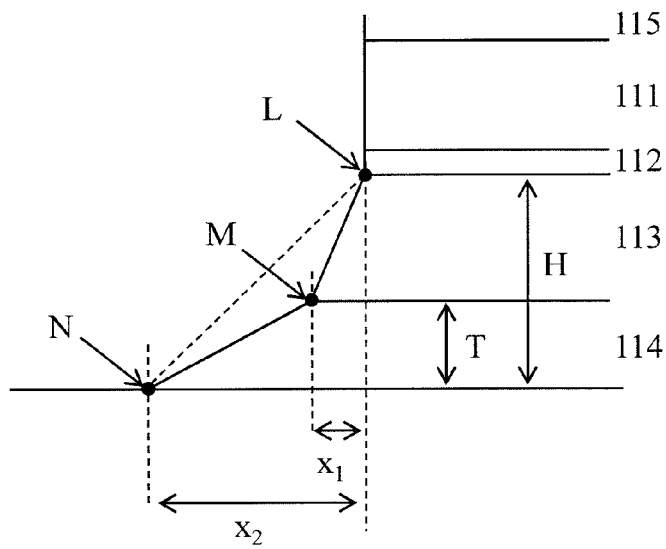
FIG. 4 is a diagram for explaining a tapered shape of a non-magnetic metal layer.

As shown in FIG. 4, when an extended width in the track width direction at the first end face of the non-magnetic metal layer 114 with respect to the intermediate layer 112 is $x_1$, and an extended width in the track width direction at the second end face of the non-magnetic metal layer 114 with respect to the intermediate layer 112 is $x_2$, $x_1$ and $x_2$ are preferably in the following ranges:

$$10\ nm \leq x_2 \leq 40\ nm \quad (1)$$

$$0 \leq x_1 \leq (1-T/H)x_2 \quad (2)$$

where T is the thickness of the non-magnetic metal layer 114, and H is the distance from the second end face of the non-magnetic metal layer 114 to the intermediate layer 112. The validity of such ranges will be described below.

The thickness T of the non-magnetic metal layer 114 is in the range of not less than 0.5 nm and not more than 20 nm. T is set so as to be not less than 0.5 nm because, if the film thickness is too small, the main pole 120 and the pinned layer 113 may be magnetically coupled. The film thickness is set so as to be not more than 20 nm because, if the film thickness is too large, the distance between the main pole 120 and the FGL 111 is increased and the magnetic field from the main pole that acts on the FGL 111 is decreased, whereby an efficient high-frequency magnetic field cannot be obtained.

Figure 5:
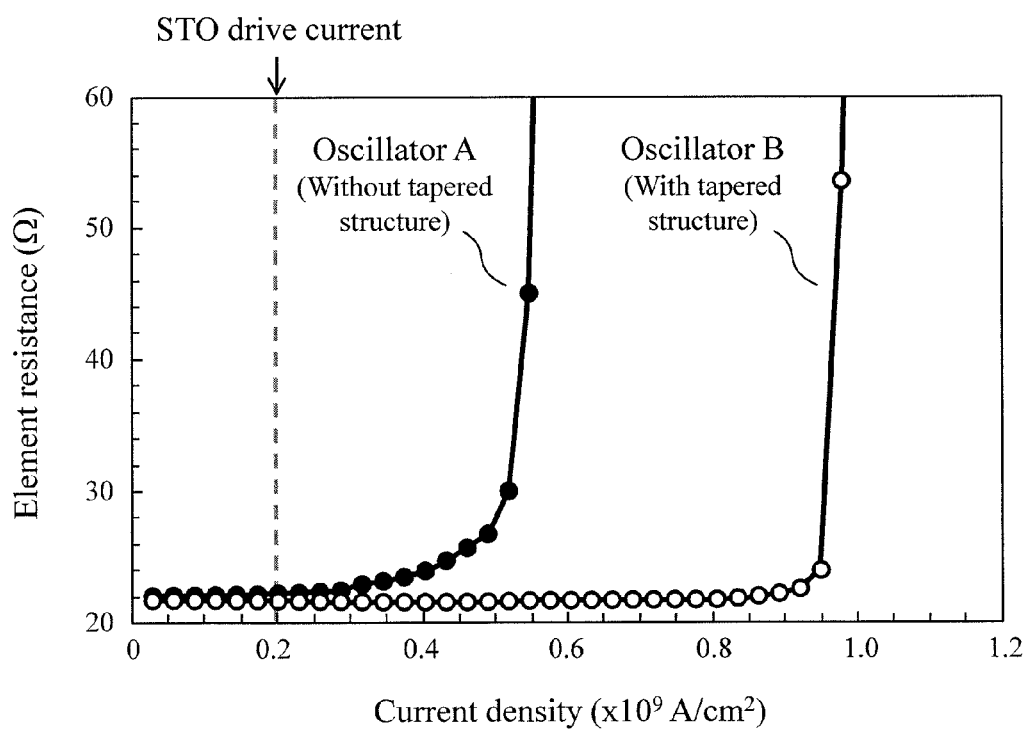
FIG. 5 is a diagram for explaining an effect of the tapered shape of the non-magnetic metal layer.

With reference to FIG. 5, the effect of the tapered shape of the non-magnetic metal layer 114 will be described. FIG. 5 is a chart showing the current resistance of an oscillator A in which the non-magnetic metal layer 114 does not have the tapered shape, and of an oscillator B in which the non-magnetic metal layer 114 has the tapered shape. In both structures, the width Two of the intermediate layer 112 of the device in the track width direction is 40 nm, and the element height SHo is equal to Two, i.e., 40 nm. The value of the current caused to flow through the device is expressed by the result of division by the area Two×SHo of the intermediate layer (average current density). The configuration of the oscillator B used for this analysis is as follows: The extended width $x_1$ in the track width direction at the first end face of the non-magnetic metal layer 114 is 5 nm; the extended width $x_2$ in the track width direction at the second end face of the non-magnetic metal layer 114 is 20 nm; the thickness T is 10 nm; and the distance H to the intermediate layer is 20 nm. In the oscillator A, $x_1$=0 nm and $x_2$=0 nm since it does not have the tapered shape; the thickness T and H are the same as those of the device B.

It is seen from FIG. 5 that the oscillator A exhibits a gradual increase in resistance as the current is increased, and exhibits a sharp increase in resistance when the current flowing through the device is close to $5 \times 10^8$ A/cm$^2$. The resistance increase indicates that electromigration is gradually progressing in the device, and that the device structure completely breaks down when the current on the order of $5 \times 10^8$ A/cm$^2$ flows through the device. The amount of current at which the device breaks down is hereafter defined as a "breakdown current". Thus, when the breakdown current is close to the drive current, the failure in which the oscillator is broken after the device is repeatedly driven may occur more readily, with the result of a decrease in reliability. On the other hand, in the oscillator B according to the present embodiment, there is hardly any increase in resistance even when the current flow through the device is increased, and no device breakdown occurs until the current flow through the device is $1 \times 10^9$ A/cm$^2$. Thus, the oscillator is not degraded even after repeatedly driven in the oscillation range of the oscillator, showing higher current resistance than the conventional oscillator A.

Figure 6:
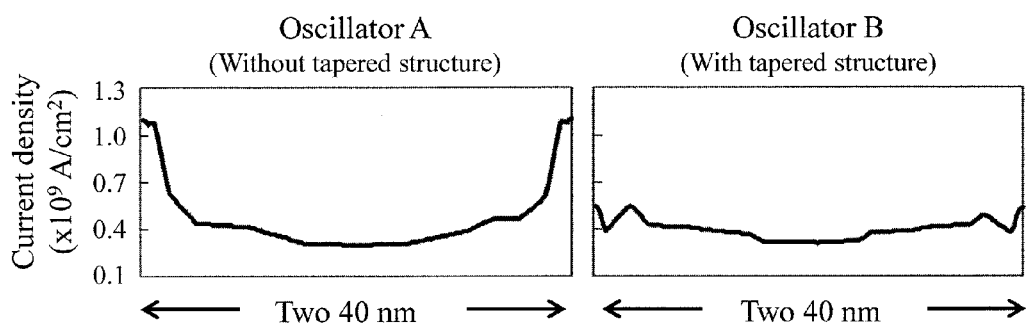
FIG. 6 shows charts comparing current distributions in the intermediate layer between the oscillator including the non-magnetic metal layer with the tapered shape and the oscillator not including such non-magnetic metal layer.

The improvement in current resistance of the device due to the tapered shape of the non-magnetic metal layer 114 will be described with reference to FIG. 6. FIG. 6 shows current distribution profiles of the intermediate layer 112 in the track width direction of the oscillator A without the tapered shape of the non-magnetic metal layer 114 and of the oscillator B with the tapered shape of the non-magnetic metal layer 114. It is seen that in the oscillator A, high current density areas exceeding $1 \times 10^9$ A/cm$^2$ are locally produced at the ends of the intermediate layer 112. Thus, at the end portions, Cu in the intermediate layer 112 causes electromigration, and the device structure is broken down as dispersion of Cu progresses. Eventually, the resistance is greatly increased, as shown in FIG. 5, and complete device breakdown results. On the other hand, it is seen that, in the oscillator B according to the present embodiment, the current distribution in the intermediate layer 112 is uniform. This indicates that the sharp narrowing of current from the main pole to the oscillator, which is the cause of current crowding in the device, is mitigated by the tapered structure of the non-magnetic metal layer 114 in the oscillator B, and that a good current path to the intermediate layer is formed without current crowding. Thus, by adopting the device structure in which the non-magnetic metal layer 114 has the tapered shape, current crowding in the oscillator, particularly in the intermediate layer, can be prevented, whereby a high current-resistance oscillator can be obtained.

The range of the tapered shape of the non-magnetic metal layer 114 according to the present embodiment and its effect will be described with reference to FIGS. 7 to 9. In order to avoid current crowding at the end portions of the intermediate layer 112 and enable the formation of a uniform current distribution, it is important to widen the entrance of current into the oscillator and thereby prevent the sharp narrowing of current from the main pole to the oscillator, and to gradually narrow the width up to the intermediate layer so that a sharp current path confinement does not occur in the oscillator. Thus, the extended width $x_2$ in the track direction at the second end face of the non-magnetic metal layer 114 adjacent to the main pole 120, and $x_1/x_2$ indicating the degree of inclination of the sides of the non-magnetic metal layer 114 can be used as parameters of the effect. These ranges are quantitatively expressed by the expressions (1) and (2), which indicate the range of the tapered shape such that a sufficient effect can be obtained by the configuration of the present embodiment.

Figure 7:
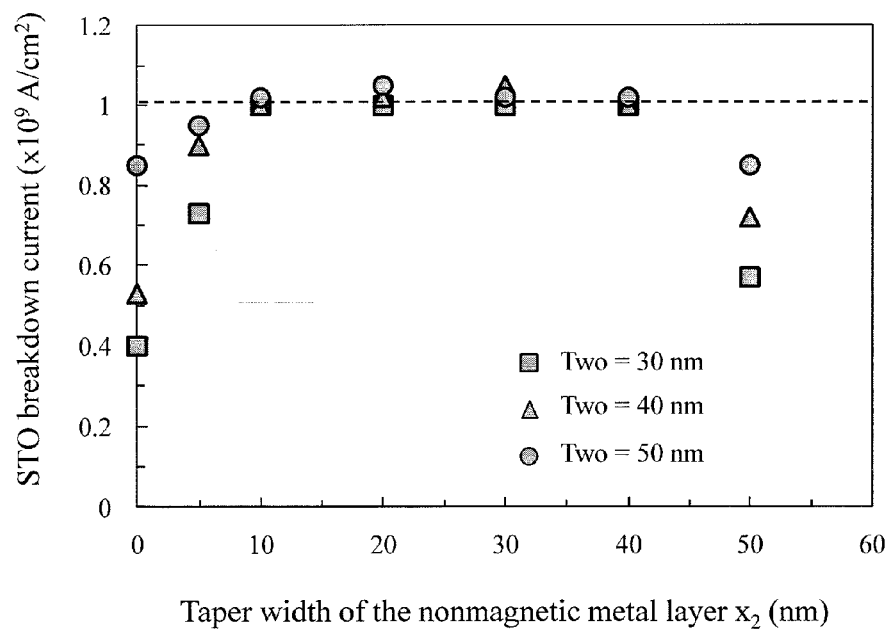
FIG. 7 is a chart showing the relationship between an extension $x_2$ of the non-magnetic metal layer and the breakdown current.

FIG. 7 is a plot of the relationship between the extended width $x_2$ in the track direction at the second end face of the non-magnetic metal layer 114 and the device breakdown current. In the present analysis, the thickness T of the non-magnetic metal layer 114 was 10 nm, the distance H to the intermediate layer was 20 nm, and the extended width $x_1$ in the track direction at the first end face of the non-magnetic metal layer 114 was 0 nm. The analysis was conducted in cases where the width Two of the intermediate layer 112 of the oscillator was 30 nm, 40 nm, and 50 nm, with the element height SHo also varied similarly to be equal to Two.

It is seen from FIG. 7 that the breakdown current is $1 \times 10^9$ A/cm$^2$ in the range of $x_2$ of not less than 10 nm and not more than 40 nm, indicating that in this range, current crowding in the end portions of the intermediate layer is mitigated and a uniform current distribution is obtained. The breakdown current density is decreased again after $x_2$ is more than 40 nm due to the following reason. When the second end face of the non-magnetic metal layer 114 is extended too much in the track width direction, the current path is sharply confined in the end portions of the pinned layer 113, and current crowding is caused in the confinement portion, whereby the current distribution in the intermediate layer 112 also becomes non-uniform with high current densities at the end portions. Accordingly, the sufficient effect of mitigating current crowding can be obtained in the range of 10 nm $\leq x_2 \leq$ 40 nm according to expression (1).

Figure 8:
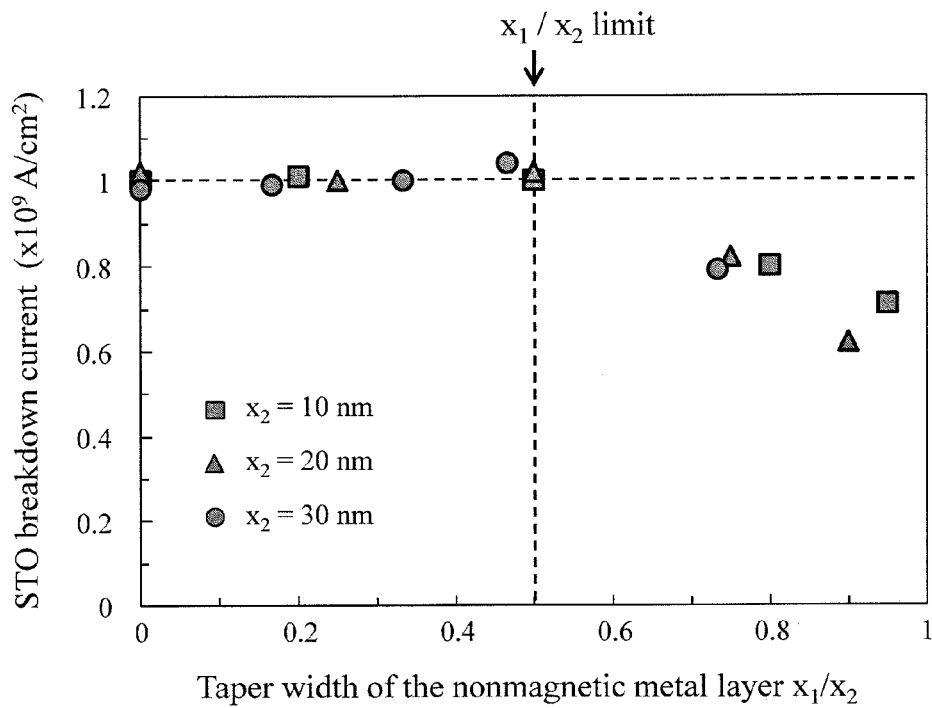
FIG. 8 is a chart showing the relationship between an extension $x_1/x_2$ of the non-magnetic metal layer and the breakdown current.

FIG. 8 is a plot of changes in the device breakdown current observed when the ratio $x_1/x_2$ was varied. In the present analysis, $x_1$ was varied in each of the cases where $x_2$ was 10 nm, 20 nm, and 30 nm. The thickness T of the non-magnetic metal layer 114 was 10 nm, the distance H to the intermediate layer 112 was 20 nm, the width Two of the intermediate layer 112 of the oscillator was 40 nm, and the element height SHo was equal to Two. It is seen from FIG. 8 that the breakdown current is decreased as $x_1/x_2$ becomes greater than 0.5. The value of $x_1/x_2$ at which the breakdown current exhibits a decrease as $x_1/x_2$ is increased is referred to as "$x_1/x_2$ (limit)".

Figure 9:
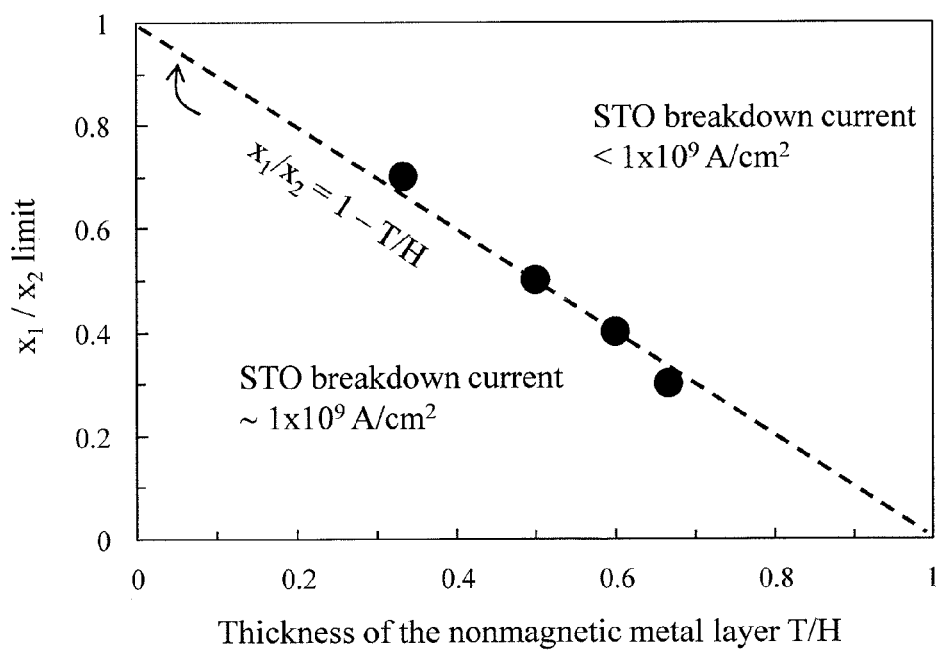
FIG. 9 is a chart showing the relationship between $x_1/x_2$ and T/H.

FIG. 9 is a plot of the values of $x_1/x_2$ (limit) corresponding to T/H as the thickness T of the non-magnetic metal layer 114 was varied. In this case, an analysis was conducted for T=5 nm, 10 nm, 15 nm, and 20 nm. In each configuration, the thickness of the pinned layer 113 was 10 nm, and the distance H to the intermediate layer 112 was T+10 nm. The width Two of the intermediate layer of the oscillator was 40 nm, and the element height SHo was equal to Two. The values for $x_1/x_2$ (limit) in each configuration were obtained by varying the magnitudes of $x_1$ and $x_2$, as in the analysis of FIG. 8.

It is seen from FIG. 9 that $x_1/x_2$ (limit) satisfies the relationship $x_1/x_2=1-T/H$. Namely, when $x_1/x_2 \leq 1-T/H$, current crowding in the intermediate layer 112 is mitigated, and a uniform current distribution is obtained. What this relational expression means is that, as shown in FIG. 4, the end (M point) of the first end face of the non-magnetic metal layer 114 in the track width direction is located either on the oscillator side of a line connecting the end (N point) of the second end face of the non-magnetic metal layer 114 in the track width direction and the end (L point) of the intermediate layer in the track width direction, or on the line L-N. When $x_1/x_2 > 1-T/H$, i.e., when the end (M point) of the first end face of the non-magnetic metal layer in the track width direction is located outside the line (L-N) connecting the end of the second end face of the non-magnetic metal layer in the track width direction and the end of the intermediate layer in the track width direction, with respect to the device, the current path from the pinned layer 113 to the intermediate layer 112 is sharply confined, whereby current crowding is produced in the end portions of the intermediate layer and the breakdown current is decreased. Thus, a sufficient effect of mitigating current crowding can be obtained in the range of $0 \leq x_1 \leq (1-T/H) x_2$ according to expression (2).

Thus, according to the configuration of the present embodiment, the non-magnetic metal layer 114 disposed adjacent to the main pole 120 has a tapered shape with the width in the track width direction increasing gradually from the trailing side toward the leading side such that expressions (1) and (2) are satisfied, whereby current crowding in the oscillator can be prevented, and a high current-resistance oscillator can be obtained.

Embodiment 2

Figure 10:
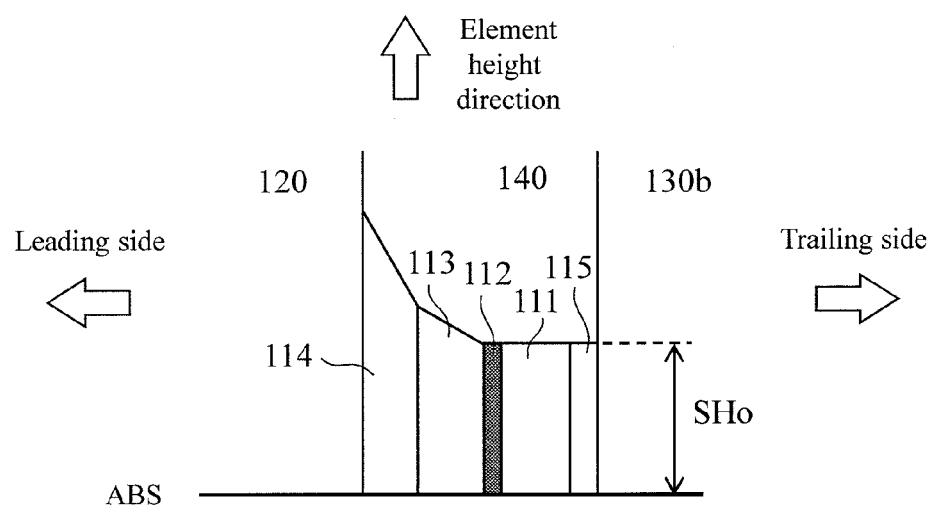
FIG. 10 is a schematic cross sectional view of an example of the oscillator of the magnetic head as viewed laterally.
Figure 11:
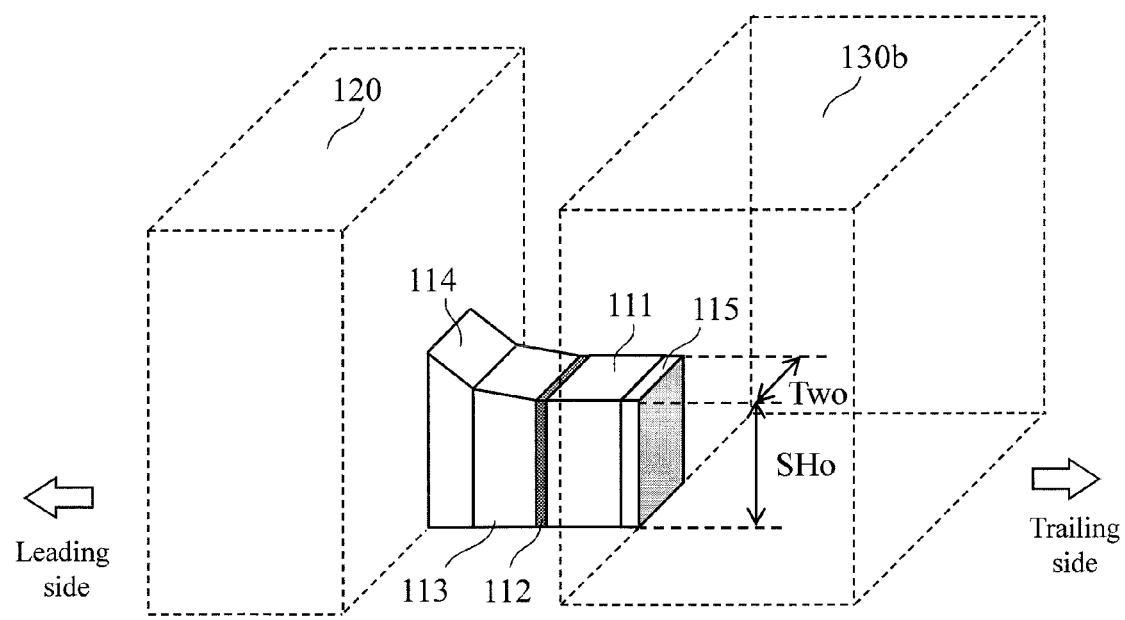
FIG. 11 is a perspective view of a configuration example of the oscillator of the magnetic head.

According to the present embodiment, an example of a configuration in which, while the non-magnetic metal layer 114 on the main pole 120 side has a tapered shape as in Embodiment 1, the direction in which the width is increased is different from Embodiment 1 will be described. FIGS. 10 and 11 show a configuration example of the main pole 120 and oscillator 110 portions of the present embodiment. FIG. 10 is a schematic cross sectional view of the oscillator of the magnetic head as viewed laterally with the air bearing surface facing the bottom. FIG. 11 is a perspective view of the oscillator of the recording section.

The present invention is characterized in that the non-magnetic metal layer 114 disposed adjacent to the main pole 120 has a tapered shape such that the width in the element height direction is gradually increased toward the leading side. In other words, the non-magnetic metal layer 114 has a shape such that the element height at the end face (first end face) closer to the intermediate layer is equal to or greater than the element height SHo of the intermediate layer 112, and the element height at the end face (second end face) farther from the intermediate layer 112 is greater than the element height at the first end face, the element height becoming gradually greater as the distance from the intermediate layer is increased. In the case of FIG. 11, a current is caused to flow through the oscillator 110 in a direction from the pinned layer 113 toward the FGL 111.

Figure 12:
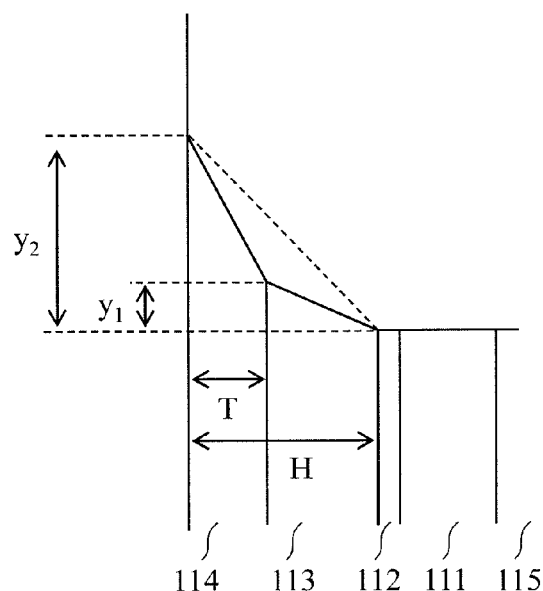
FIG. 12 is a diagram for explaining the tapered shape of the non-magnetic metal layer.

When, as shown in FIG. 12, an extended width in the element height direction at the first end face of the non-magnetic metal layer 114 with respect to the intermediate layer 112 is $y_1$, and an extended width in the element height direction at the second end face with respect to the intermediate layer 112 is $y_2$, the tapered shape of the non-magnetic metal layer 114 has the following relationships, as in the case of the track width direction according to Embodiment 1:

$$10 \text{ nm} \leq y_2 \leq 40 \text{ nm} \qquad (3)$$

$$0 \leq y_1 \leq (1-T/H)y_2 \qquad (4)$$

where T is the thickness of the non-magnetic metal layer 114, and H is the distance from the second end face of the non-magnetic metal layer 114 to the intermediate layer 112. The material of the layers of the oscillator 110, film thickness, and the like are similar to those according to Embodiment 1.

As shown in FIGS. 10 to 12, the oscillator 110 is formed by stacking the pinned layer 113, the intermediate layer 112, and the FGL 111 in that order from the main pole 120 side. However, the FGL 111, the intermediate layer 112, and the pinned layer 113 may be stacked in that order from the main pole 120 side. In this case, too, a current is caused to flow through the oscillator 110 in a direction from the pinned layer 113 toward the FGL 111. In order to block magnetic coupling between the FGL 111 and the trailing shield 130*b*, the non-magnetic metal layer 115 may be disposed on the trailing shield 130*b* side, as shown in FIGS. 10 to 12. By adopting the above configuration, current crowding in the oscillator can be prevented, and a high current-resistance oscillator can be obtained. As the present embodiment provides substantially the same effect as according to the configuration described with reference to Embodiment 1, description of the effect will be omitted.

Embodiment 3

Figure 13:
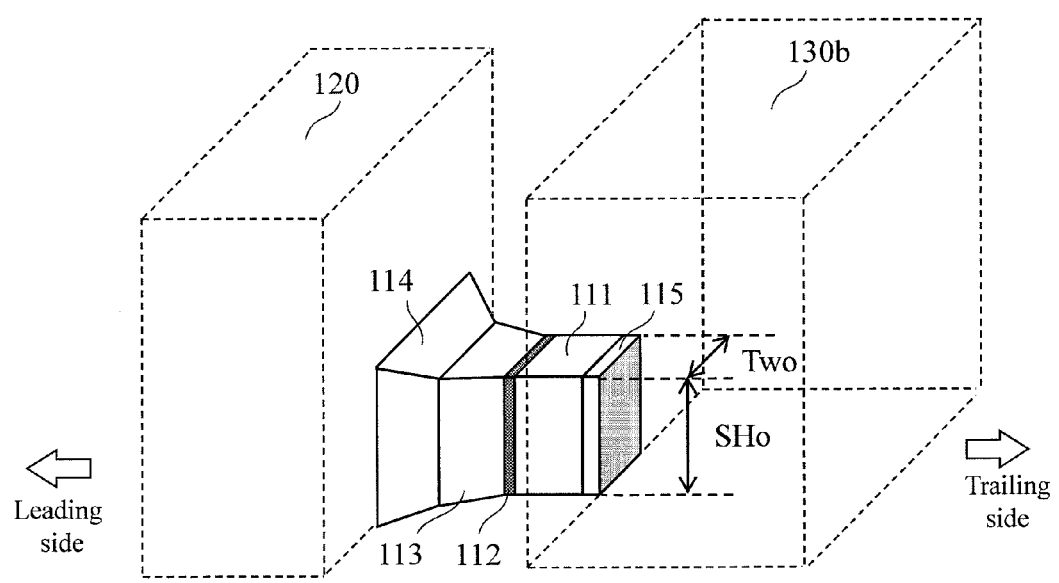
FIG. 13 is a perspective view of a configuration example of the oscillator of the magnetic head.

FIG. 13 is a perspective view of the oscillator disposed in the recording section of the magnetic head according to the present embodiment. In the present embodiment, an example of a configuration in which the non-magnetic metal layer 114 has a tapered shape such that the width in the track width direction is gradually increased toward the leading side, and the width is also gradually increased in the element height direction.

The present embodiment is characterized in that the non-magnetic metal layer 114 disposed adjacent to the main pole 120 side has a tapered shape such that the width is gradually increased both in the track width direction and the element height direction toward the leading side. The tapered shape according to the present embodiment is defined similarly to Embodiments 1 and 2. Namely, when an extended width in the track width direction at the trailing side end face (first end face) of the non-magnetic metal layer 114 with respect to the intermediate layer 112 is $x_1$, an extended width in the track width direction at the leading side end face (second end face) is $x_2$, an extended width in the element height direction at the trailing side end face (first end face) is $y_1$, and an extended width in the element height direction at the leading side end face (second end face) is $y_2$, the tapered shape of the non-magnetic metal layer 114 has the relationships according to expressions (1), (2), (3), and (4). The material of the layers of the oscillator 110, film thickness, and the like are similar to those according to Embodiment 1. In order to block magnetic coupling between the FGL 111 and the trailing shield 130*b*, the non-magnetic metal layer 115 may be disposed as shown in FIG. 13. As shown in FIG. 13, the oscillator 110 is formed by stacking the pinned layer 113, the intermediate layer 112, and the FGL 111 in that order from the main pole 120 side.

However, the FGL 111, the intermediate layer 112, and the pinned layer 113 may be stacked in that order from the main pole 120 side.

Figure 14:
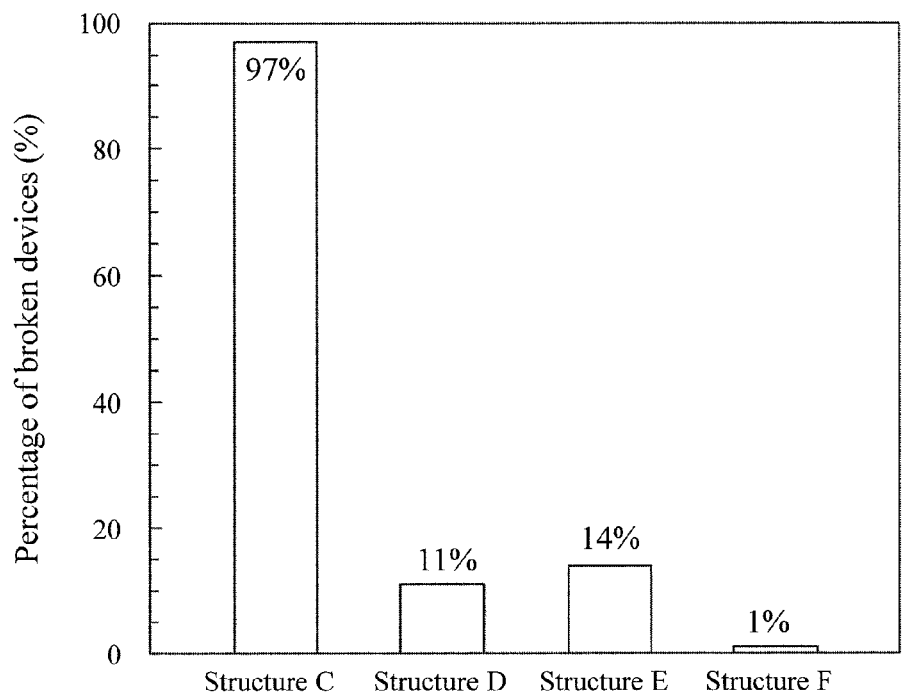
FIG. 14 is a chart comparing the current resistance of various configurations of the oscillator.

By the configuration according to the present embodiment, a magnetic head with reliability even higher than according to Embodiments 1 and 2 can be realized. With reference to FIG. 14, the effect of the present embodiment will be described. Specifically, a current destruction reliability test was conducted on the four structures of an oscillator (structure C) with the non-magnetic metal layer 114 having no tapered shape; an oscillator (structure D) with the tapered shape with the width increasing in the track width direction according to Embodiment 1; an oscillator (structure E) with the tapered shape with the width increasing in the element height direction according to Embodiment 2; and an oscillator (structure F) with the tapered shape with the width increasing in both the track width direction and the element height direction according to the present embodiment. The parameters of the structures in the present analysis are shown in Table 1.

TABLE 1

|  | Structure C | Structure D | Structure E | Structure F |
|---|---|---|---|---|
| Two (nm) | 30 | 30 | 30 | 30 |
| SHo (nm) | 30 | 30 | 30 | 30 |
| T (nm) | 10 | 10 | 10 | 10 |
| H (nm) | 20 | 20 | 20 | 20 |
| $x_1$ (nm) | 0 | 5 | 0 | 5 |
| $x_2$ (nm) | 0 | 15 | 0 | 15 |
| $y_1$ (nm) | 0 | 0 | 5 | 5 |
| $y_2$ (nm) | 0 | 0 | 15 | 15 |

FIG. 14 is a graph showing the percentage of the devices broken when a high current was caused to flow through 100 magnetic heads each of the oscillator structures C to F. Specifically, a current of 4.5 mA was caused to flow through the device for one minute such that an average current density through the intermediate layer was $5 \times 10^8$ A/cm². It is seen from FIG. 14 that the structure F has the highest current resistance, producing hardly any broken devices. This indicates that the magnetic head with the highest reliability can be obtained with the structure of the non-magnetic metal layer with the tapered shape such that the width is increased in both the track width direction and the element height direction. The broken devices produced in the configuration D according to Embodiment 1 and the configuration E according to Embodiment 2 are due to the variations in the finished shape of the devices that were actually manufactured. With the structure F according to the present embodiment, because of the tapered shape such that the width is increased in both the track width direction and the element height direction, the development of defect due to the variations in the finished devices can be suppressed.

Thus, when the non-magnetic metal layer 114 disposed adjacent to the main pole 120 side has the tapered shape such that the width is gradually increased in both the track width direction and the element height direction with increasing distance from the intermediate layer, a high current-resistance oscillator can be obtained, and a magnetic head with reliability even higher than according to the configurations of Embodiments 1 and 2 can be realized.

Embodiment 4

Figure 15:
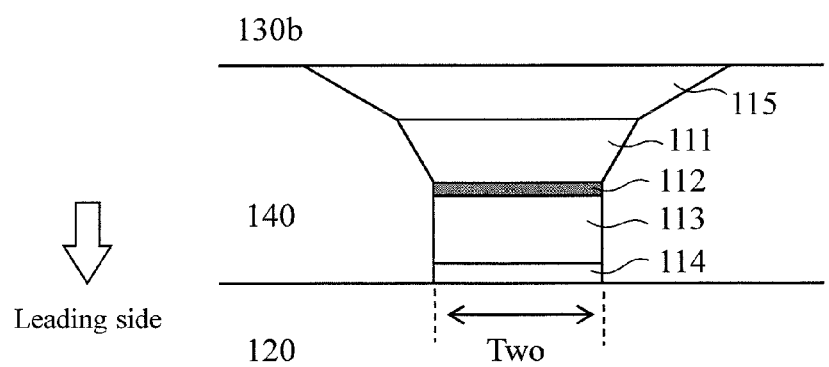
FIG. 15 is a schematic diagram of an example of the oscillator of the magnetic head as viewed from the air bearing surface.
Figure 16:
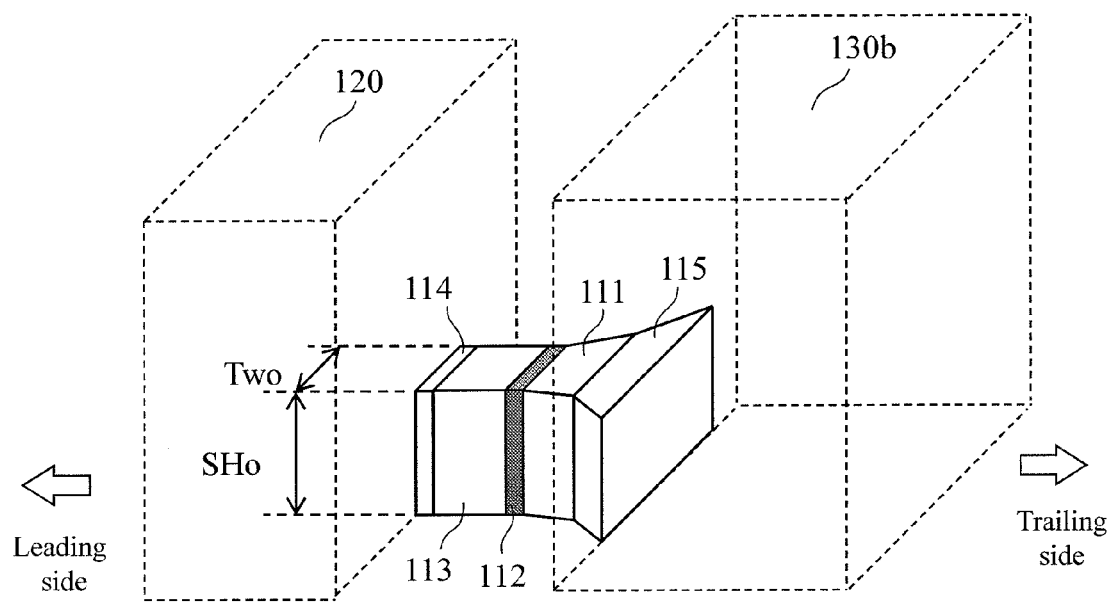
FIG. 16 is a perspective view of a configuration example of the oscillator of the magnetic head.

According to the present embodiment, an example of a configuration in which, while the non-magnetic metal layer has a tapered shape as according to Embodiment 1, the position and the tapering direction of the non-magnetic metal layer are different will be described. FIGS. 15 and 16 illustrate a configuration example of the recording section 100 of the magnetic head according to the present embodiment. FIG. 15 is a schematic diagram of the main pole 120 and the oscillator 110 as parts of the recording section 100 as viewed from the air bearing surface, with the leading side at the bottom. FIG. 16 is a perspective view of the oscillator.

The present embodiment is characterized in that the non-magnetic metal layer 115 disposed adjacent to the trailing shield 130b side has a tapered shape such that the width is gradually increased in the track width direction from the leading side toward the trailing side. In other words, in the structure, the width in the track width direction at the end face (first end face) of the non-magnetic metal layer 115 on the side closer to the intermediate layer 112 is equal to or greater than the track width Two of the intermediate layer 112, and the width in the track width direction at the end face (second end face) of the non-magnetic metal layer 115 on the side farther from the intermediate layer 112 is greater than the width in the track direction at the first end face, the width in the track width direction at the non-magnetic metal layer 115 gradually increasing with increasing distance from the intermediate layer 112. Namely, this is the case where the shape of the oscillator 110 according to Embodiment 1 has been inverted in the up-down direction. A current is caused to flow through the oscillator 110 in a direction from the pinned layer 113 toward the FGL 111.

Figure 17:
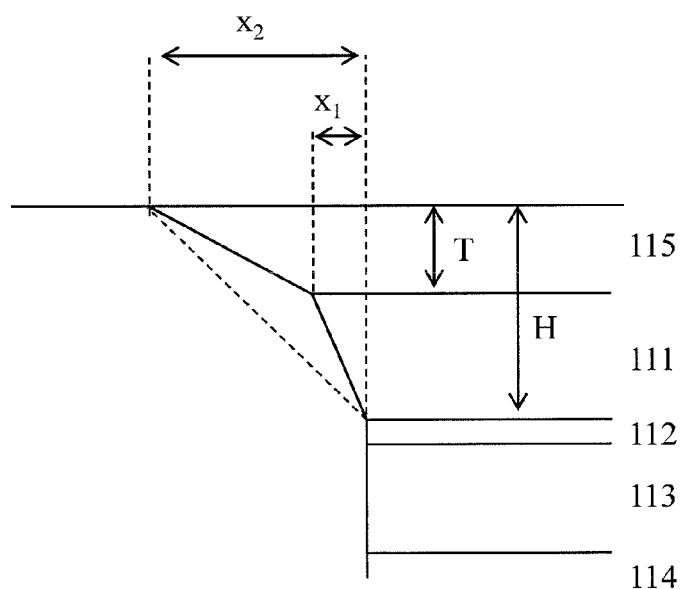
FIG. 17 is a diagram for explaining the tapered shape of the non-magnetic metal layer.

As shown in FIG. 17, when, as in Embodiment 1, the extended width in the track width direction at the first end face of the non-magnetic metal layer 115 with respect to the intermediate layer 112 is $x_1$, and the extended width in the track width direction at the second end face of the non-magnetic metal layer 115 with respect to the intermediate layer 112 is $x_2$, the tapered shape of the non-magnetic metal layer 115 has the relationships according to expressions (1) and (2), as in the track width direction according to Embodiment 1, where T is the thickness of the non-magnetic metal layer 115, and H is the distance from the second end face of the non-magnetic metal layer 115 to the intermediate layer 112. The non-magnetic metal layer 115 disposed on the trailing shield 130b side of the oscillator 110 has the purpose of blocking magnetic coupling between the FGL 111 and the trailing shield 130b.

The material of the non-magnetic metal layer 115 is Ta, for example. However, any material that is magnetically non-magnetic and that exhibits electrically metallic conduction may be used. Examples of the material other than Ta include Ru, Pt, Cr, and Ir. Not just a single material, but also an alloy or a stack of materials may be used. The thickness T of the non-magnetic metal layer 115 is in the range of not less than 0.5 nm and not more than 20 nm. The thickness T is set so as to be not less than 0.5 nm because if the film thickness is too small, the trailing shield 130b and the FGL 111 may be magnetically coupled. The film thickness is set so as to be not more than 20 nm because if the distance between the trailing shield 130b and the FGL 111 is too much, the magnetic field from the main pole acting on the FGL 111 may be decreased, and an efficient high-frequency magnetic field may not be obtained. As shown in FIGS. 15 to 17, the oscillator 110 is formed by stacking the pinned layer 113, the intermediate layer 112, and the FGL 111 in that order from the main pole 120 side. However, the FGL 111, the intermediate layer 112, and the pinned layer 113 may be stacked in that order from the main pole 120 side. The material of the layers of the oscillator 110, film thickness, and the like are similar to those according to Embodiment 1. In any case, a current is caused to flow through the oscillator 110 in a direction from the pinned layer 113 toward the FGL 111.

In order to block magnetic coupling between the pinned layer 113 and the main pole 120, the non-magnetic metal layer 114 may be disposed on the main pole 120 side, as shown in FIGS. 15 to 17. In this case, however, the non-magnetic metal layer 114 does not have the tapered shape according to Embodiments 1 to 3. This is because if both the non-magnetic metal layer 114 on the main pole 120 side and the non-magnetic metal layer 115 on the trailing shield 130b side have the tapered shape simultaneously, current may be concentrated in the end portions of the intermediate layer 112, whereby the current resistance of the device may be adversely affected.

According to the configuration of the present embodiment, substantially the same effect as according to the configuration of Embodiment 1 can be obtained. This is because, when the equipotential plane of an electric field formed in the oscillator is considered, when the shape of the oscillator 110 of Embodiment 1 is inverted with respect to the up-down direction, the distribution of the equipotential lines formed are also inverted with respect to the up-down direction, so that the current distribution in the intermediate layer 112 that influences the current resistance is the same as that according to the configuration of Embodiment 1.

Figure 18:
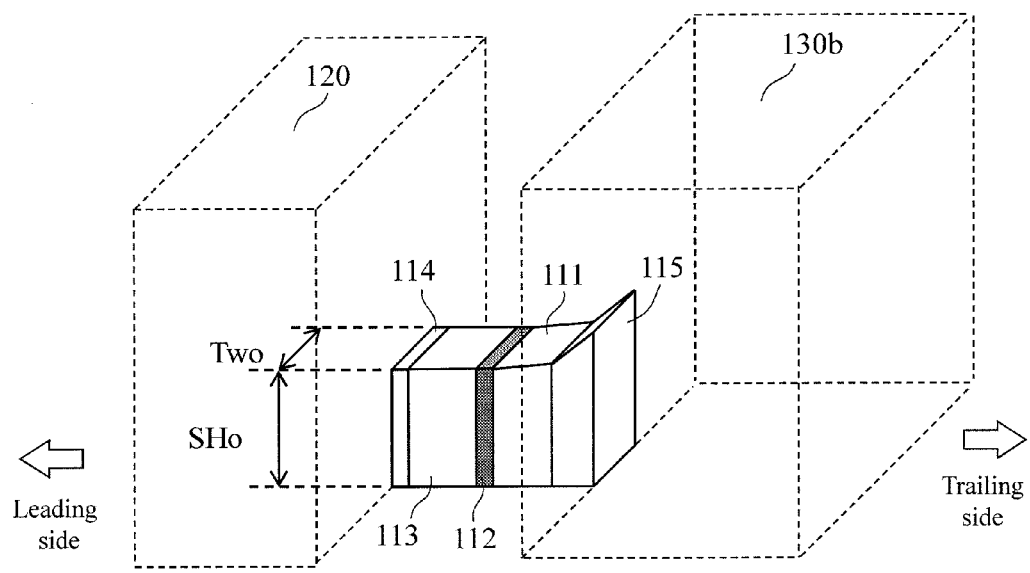
FIG. 18 is a perspective view of a configuration example of the oscillator of the magnetic head.

As shown in FIG. 18, the non-magnetic metal layer 115 disposed adjacent to the trailing shield 130b side may have a tapered shape such that the width is gradually increased in the element height direction rather than in the track width direction toward the trailing side. The configuration example shown in FIG. 18 is a reversal of the shape of the oscillator 110 of Embodiment 2 in the track direction. Thus, substantially the same effect as according to the configuration of Embodiment 2 can be obtained, and a high current-resistance oscillator can be obtained.

Figure 19:
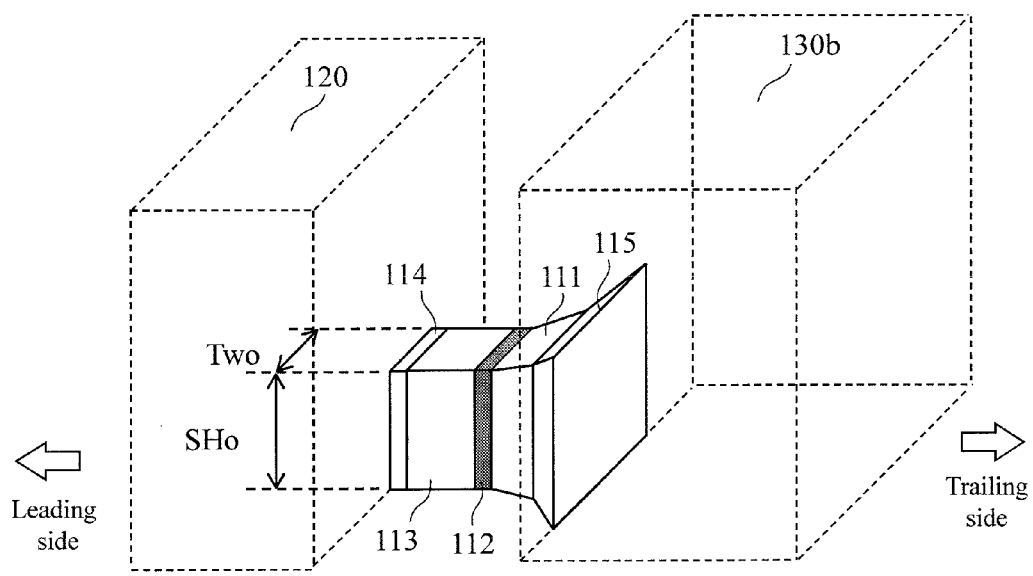
FIG. 19 is a perspective view of a configuration example of the oscillator of the magnetic head.

Further, as shown in FIG. 19, the non-magnetic metal layer 115 disposed adjacent to the trailing shield 130b side may have a tapered shape such that the width is gradually increased in both the track width direction and the element height direction toward the trailing side. The configuration example shown in FIG. 19 is a reversal of the shape of the oscillator 110 of Embodiment 3 in the track direction. Thus, substantially the same effect as according to the configuration of Embodiment 3 can be obtained, whereby a high current-resistance oscillator can be obtained and a magnetic head with high reliability can be realized.

Embodiment 5

Figure 20:
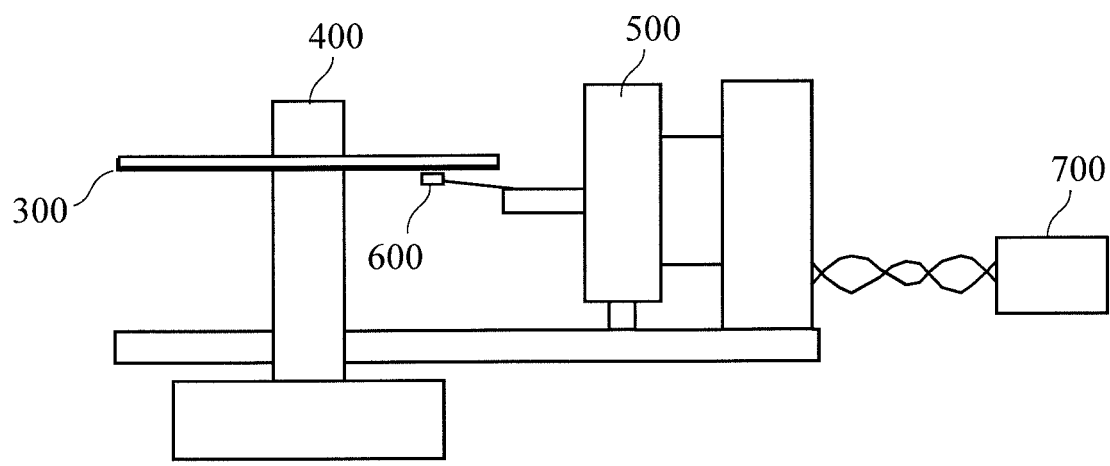
FIG. 20 is a schematic diagram of a configuration example of a magnetic recording/reproducing apparatus.

FIG. 20 shows a schematic diagram of a configuration example of a magnetic recording/reproducing apparatus provided with the magnetic head according to the present invention. The magnetic head, which may be the one according to any of Embodiments 1 to 4, is mounted on a head slider 600. In the magnetic recording/reproducing apparatus illustrated in FIG. 20, a magnetic recording medium 300 is rotated on a spindle motor 400, and the head slider 600 is guided to a desired track on the magnetic recording medium 300 by an actuator 500. Specifically, in the magnetic recording/reproducing apparatus, the reproducing head and the recording head formed on the head slider 600 are relatively moved in proximity to a predetermined recording position on the magnetic recording medium 300 by the mechanism to successively write or read signals. Preferably, the actuator 500 may include a rotary actuator. The magnetic recording medium 300 may include the so-called continuous media in which bits are continuously present, or the so-called discrete track media in which non-magnetic areas that cannot be written to by the recording head are provided between tracks. The magnetic recording medium 300 may further include the so-called patterned media in which a substrate includes a non-magnet filling recesses between convex magnetic patterns. The recording signal is recorded in the medium by the recording head through a recording signal processing system 700. The output from the reproducing head is processed in the recording signal processing system 700 to obtain a reproduction signal. When the reproducing head is moved to a desired recording track, the track position is detected by using the high-sensitivity output from the reproducing head, and the head slider 600 is positioned by controlling the actuator 500. While one each of the head slider 600 and the magnetic recording medium 300 is illustrated, a plurality of the head sliders 600 or the magnetic recording media 300 may be provided. The magnetic recording medium 300 may include recording layers on both sides for recording information. When the magnetic recording medium 300 has the recording layers on both sides, the head slider 600 may be disposed on each side of the magnetic recording medium 300.

The present invention is not limited to the above-described embodiments and may include various modifications. The foregoing embodiments have been described in detail to aid an understanding of the present invention, and are not limited to those provided with all of the configurations described. A part of the configuration of one embodiment may be substituted by the configuration of another embodiment, or the configuration of one embodiment may be added to the configuration of another embodiment. The configuration of each embodiment may be partially modified by addition, deletion, or substitution with another configuration.

REFERENCE SIGNS LIST

100: recording section
110: oscillator
111: high-frequency magnetic field generation layer (FGL)
112: intermediate layer
113: spin injection pinned layer
114: non-magnetic metal layer
115: non-magnetic metal layer
120: main pole
130a: sub-pole
130b: trailing shield
140: refill insulation layer
150: coil
200: reproduction section
210: reproduction sensor
220: lower magnetic shield
230: upper magnetic shield
300: magnetic recording medium
400: spindle motor
500: actuator
600: head slider
700: recording signal processing system

What is claimed is:
1. A magnetic head comprising:
a main pole that generates a recording magnetic field;
a trailing shield disposed opposite the main pole; and
an oscillator disposed between the main pole and the trailing shield that generates a high-frequency magnetic field,
wherein:

the oscillator includes a non-magnetic metal layer, a spin injection pinned layer, an intermediate layer, and a high-frequency magnetic field generation layer; and the non-magnetic metal layer is disposed adjacent to the main pole or the trailing shield and tapered with a width in a track width direction gradually increased with increasing distance from the intermediate layer.

2. The magnetic head according to claim 1, wherein a relationship $$10\ nm \leq x_2 \leq 40\ nm$$

is satisfied, where $x_2$ is an extended width, with respect to the intermediate layer, in the track width direction at an end face of the non-magnetic metal layer on a side farther from the intermediate layer.

3. The magnetic head according to claim 1, wherein an end in the track width direction of an end face of the non-magnetic metal layer on a side closer to the intermediate layer is on the oscillator side of, or on, a line connecting an end in the track width direction of an end face of the non-magnetic metal layer on a side farther from the intermediate layer and an end in the track width direction of the intermediate layer.

4. The magnetic head according to claim 1, wherein the non-magnetic metal layer is tapered with the width both in the track width direction and in an element height direction gradually increased from an end face on a side closer to the intermediate layer toward an end face on a side farther from the intermediate layer.

5. The magnetic head according to claim 1, wherein the oscillator includes a second, non-tapered non-magnetic metal layer on an end on the side opposite from the side on which the tapered non-magnetic metal layer is provided.

6. The magnetic head according to claim 1, wherein a current is caused to flow through the oscillator in a direction from the spin injection pinned layer toward the high-frequency magnetic field generation layer.

7. A magnetic head comprising:
a main pole that generates a recording magnetic field;
a trailing shield disposed opposite the main pole; and
an oscillator disposed between the main pole and the trailing shield that generates a high-frequency magnetic field,
wherein:
the oscillator includes a non-magnetic metal layer, a spin injection pinned layer, an intermediate layer, and a high-frequency magnetic field generation layer; and
the non-magnetic metal layer is disposed adjacent to the main pole or the trailing shield and tapered with a width in an element height direction gradually increased with increasing distance from the intermediate layer.

8. The magnetic head according to claim 7, wherein a relationship $$10\ nm \leq y_2 \leq 40\ nm$$

is satisfied, where $y_2$ is an extended width, with respect to the intermediate layer, in the element height direction at an end face of the non-magnetic metal layer on a side farther from the intermediate layer.

9. The magnetic head according to claim 7, wherein an end in the element height direction of an end face of the non-magnetic metal layer on a side closer to the intermediate layer is on the oscillator side of or on, a line connecting an end in the element height direction of an end face of the non-magnetic metal layer on a side farther from the intermediate layer and an end in the element height direction of the intermediate layer.

10. The magnetic head according to claim 7, wherein the oscillator includes a second, non-tapered non-magnetic metal layer on an end on the side opposite from the side on which the tapered non-magnetic metal layer is disposed.

11. The magnetic head according to claim 7, wherein a current is caused to flow through the oscillator in a direction from the spin injection pinned layer toward the high-frequency magnetic field generation layer.

12. A magnetic recording/reproducing apparatus comprising:
a magnetic recording medium;
a medium drive unit that drives the magnetic recording medium;
a magnetic head that performs writing or reading of a signal with respect to the magnetic recording medium; and
a head drive unit that positions the magnetic head over a desired track of the magnetic recording medium,
wherein:
the magnetic head includes a main pole that generates a recording magnetic field, a trailing shield disposed opposite the main pole, and an oscillator disposed between the main pole and the trailing shield that generates a high-frequency magnetic field;
the oscillator includes a non-magnetic metal layer, a spin injection pinned layer, an intermediate layer, and a high-frequency magnetic field generation layer; and
the non-magnetic metal layer is disposed adjacent to the main pole or the trailing shield and tapered with a width in a track width direction and/or in an element height direction gradually increased with increasing distance from the intermediate layer.

13. The magnetic recording/reproducing apparatus according to claim 12, wherein the oscillator includes a second, non-tapered non-magnetic metal layer on an end on the side opposite from the side on which the tapered non-magnetic metal layer is disposed.

14. The magnetic recording/reproducing apparatus according to claim 12, wherein a current is caused to flow through the oscillator in a direction from the spin injection pinned layer toward the high-frequency magnetic field generation layer.

\* \* \* \* \*